United States Patent [19]
Reimann

[11] Patent Number: 5,398,129
[45] Date of Patent: Mar. 14, 1995

[54] PASSIVE OPTICAL TELECOMMUNICATION SYSTEM FOR NARROW BAND AND BROADBAND INTEGRATED SERVICES DIGITAL NETWORKS

[75] Inventor: Udo Reimann, Munich, Germany

[73] Assignee: Siemens Aktiengesellschaft, Munich, Germany

[21] Appl. No.: 690,299

[22] Filed: Apr. 24, 1991

[30] Foreign Application Priority Data

May 4, 1990 [DE] Germany .................... 40 14 396.1
May 21, 1990 [DE] Germany .................... 40 16 359.8

[51] Int. Cl.$^6$ ............................................. H04J 14/08
[52] U.S. Cl. .................... 359/137; 359/167; 370/95.3
[58] Field of Search .............. 359/137, 136, 135, 140, 359/125, 123, 118, 167; 370/95.3

[56] References Cited

U.S. PATENT DOCUMENTS

| 4,644,534 | 2/1987 | Sperlich .................. 370/95.3 |
| 4,726,010 | 2/1988 | Ali et al. .................. 359/125 |
| 4,748,621 | 5/1988 | Ballance et al. ........... 370/95.3 |
| 4,790,616 | 12/1988 | Frenkel .................. 350/96 |

FOREIGN PATENT DOCUMENTS

| WO88/05233 | 7/1988 | WIPO ............... H04B 9/00 |
| WO88/09093 | 11/1988 | WIPO ............... H04B 9/00 |
| WO89/09518 | 10/1989 | WIPO ............... H04B 7/24 |

OTHER PUBLICATIONS

Oakley et al., "Passive Fibre Local Loop for Telephony with Broadband Upgrade," JSSLS '88 Conf. Papers, pp. 0179–0183.
Hoppitt et al., "The provision of telephony over passive optical networks," Br. Telcom Technol. J., vol. 7, No. 2, 1989, pp. 100–113.

Primary Examiner—Herbert Goldstein
Assistant Examiner—K. Negash
Attorney, Agent, or Firm—Hill, Steadman & Simpson

[57] ABSTRACT

In a passive optical telecommunication system in which the signal transmission from a switching center downstream to remote units proceeds in a first stream on a time-division multiplex basis and in which the signal transmission from the remote units upstream to the central switching center proceeds in accordance with a TDMA method in accordance wherewith a remote unit transmits each burst in a synchronized fashion with the assistance of a delay device that is individually set with respect to each remote unit proceeding from the switching center, the remote unit already transmits the bursts before the transmission time required for a desired reception phase relation of the burst in the central switching center only after a rough delay time of a whole system clock period (or system clock periods), and the switching center centrally undertakes a respective individually-dimensioned fine delay of the bursts incoming thereat from each of the remote units into the desired reception phase relation.

6 Claims, 1 Drawing Sheet

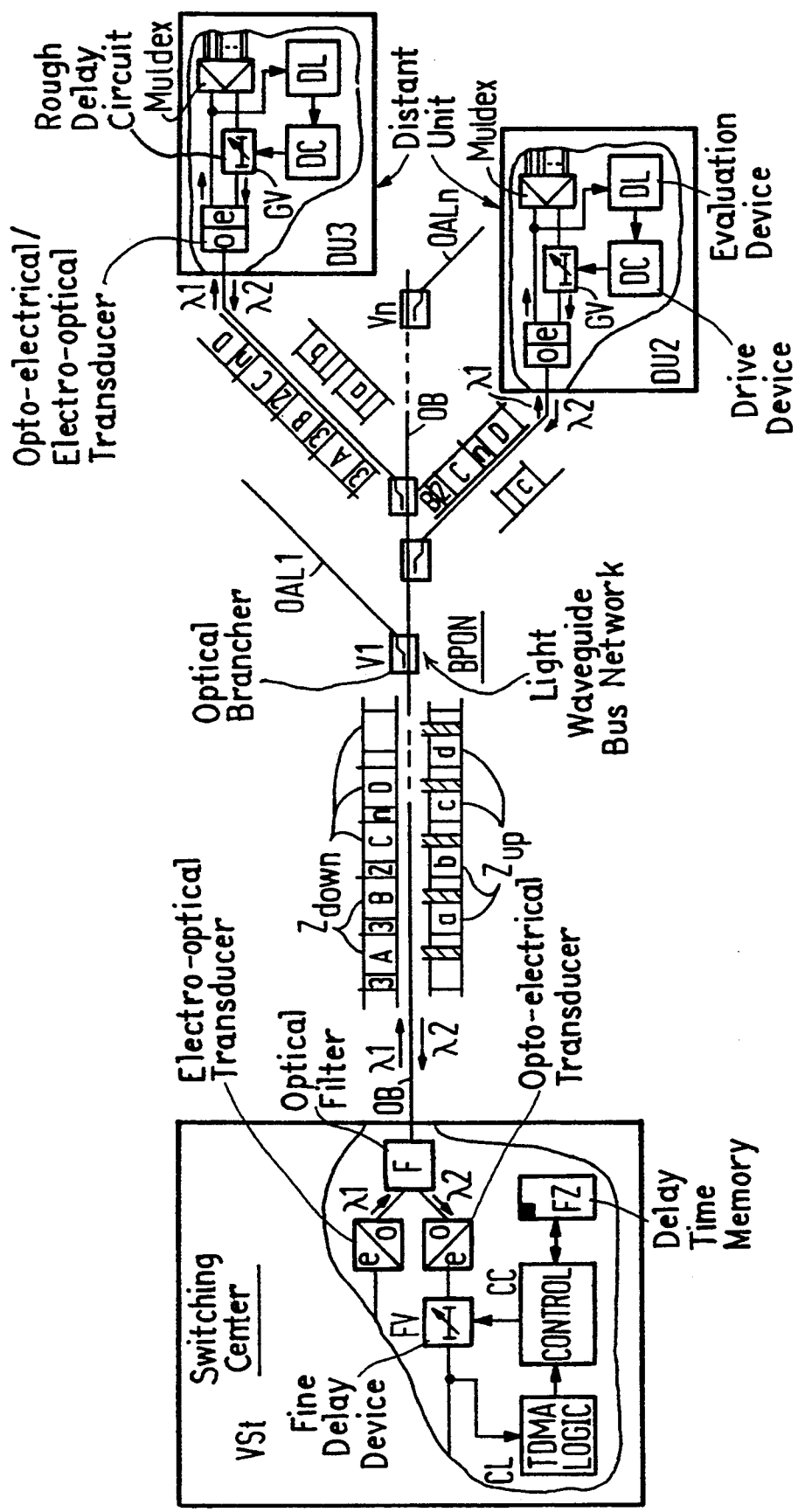

PASSIVE OPTICAL TELECOMMUNICATION SYSTEM FOR NARROW BAND AND BROADBAND INTEGRATED SERVICES DIGITAL NETWORKS

BACKGROUND OF THE INVENTION

FIELD OF THE INVENTION

The present invention relates to optical telecommunication systems and more particularly to passive optical telecommunication systems which provide integrated services digital networks that comprise a star structure of light waveguides in the level of the subscriber lines. Such integrated services digital networks equipped with light waveguides are basically suitable for narrow band and broadband services, as disclosed in the German patent 24 21 002, corresponding to U.S. Pat. No. 3,980,831, fully incorporated herein by this reference.

Insofar as electrical front-end equipment are not provided, a subscriber-associated light waveguide sub-scriber line is provided between a subscriber location and a switching center in a pure star network of light waveguide subscriber lines. The expense involved with subscriber-associated light waveguide subscriber lines which extend between subscriber locations and a switching center can be reduced by light waveguide bus networks (potentially topologically appearing as a star network), whereby a respective plurality of decentralized equipment, for example, subscriber-associated network terminations or network terminations respectively shared by a plurality of subscribers that are located directly at the subscriber or at a distance therefrom in the front end of the traffic, is respectively connected via its own light waveguide central office line to an optical brancher that is connected via a light waveguide bus to a common light waveguide terminal of the switching center, either directly or by way of at least one further optical branch. In this connection, one is referred to, for example, the publication ISSLS'88, Conference Papers 9.4.1–9.4.5; Br. Telecom Technol. J. Vol. 7, No. 2, 1989, pp. 100–113, FIG. 5; WO-A1-88/05233; and WO-81-89/09518.

In such a passive optical telecommunication system in which a respective plurality of decentralized equipment (distant units) is respectively connected via its own light waveguide central office line to an optical brancher that is, in turn, connected either directly or via at least one further optical brancher to a common light waveguide terminal of the central switching system via a light waveguide bus, the signal transmission from the switching center to the decentralized equipment can proceed continuously in a time-division multiplex (TDM) burst stream from which each decentralized equipment accepts only those bursts that are transmitted in time channels allocated accurately to these decentralized equipment, whereas the signal transmission from the decentralized equipment to the switching center proceeds in accordance with a time-division multiple access (TDMA) method in which a decentralized equipment is capable of transmitting its bursts in a time channel reserved for the decentralized equipment in a synchronized fashion with the assistance of the delay device that is set from the switching center. In this connection, one may refer to the publication ISSLS'88, op. cit, p. 9.4.2 and WO 88/09093. To that end, it is known that, based on the prescription of the loop running time between the decentralized equipment and the switching center, the switching center periodically sets a programmable, digital delay device in the decentralized equipment such that the loop running time has a prescribed value with which the bursts transmitted from the decentralized equipment lie exactly in the time channel reserved for this decentralized equipment (WO-A1-88/05233 and WO-A1-89/09518), whereby the setting can be undertaken in two stages in which, first of all, a rough delay having an accuracy of +1 bit (50 ns.) is set, this being followed by a fine delay having an accuracy of +1/10 bits (see Br. Telecom Technolog. J., op. cit, pp. 100 and 108).

A fine delay implemented in the decentralized equipment in addition to the rough delay, for example with the assistance of a variable, analog delay line, involves a corresponding circuit-oriented expense and the present invention discloses a manner of avoiding this expense.

SUMMARY OF THE INVENTION

The present invention is directed to a passive optical telecommunication system in which a respective plurality of decentralized equipment (distant units) is respectively connected via a respective light waveguide central office line to an optical brancher that is, in urn, connected either directly or via at least one further optic brancher to a common light waveguide terminal of a switching center via a light waveguide bus, whereby the signal transmission proceeding from the switching center to the decentralized equipment proceeds in a burst stream from which each decentralized equipment accepts only the burst destined for each particular decentralized equipment, and whereby the signal transmission proceeding from the decentralized equipment to the switching center proceeds in a TDMA method in accordance wherewith a decentralized equipment transmits each burst in a synchronized fashion with the assistance of a delay device set in an equipment-associated manner proceeding from the switching center. This telecommunication system is, according to the present invention, particularly characterized in that the decentralized equipment already transmits the burst before the transmission time required for a desired receiving phase relation of the burst in the switching center after only a rough delay time of one or more entire clock system periods, and in that it is the switching center that centrally undertakes a respective equipment-associated and dimensioned fine delay of the burst incoming thereat into the desired receiving phase relation.

The present invention yields the advantage of enabling the fine delay following the decentrally-effective rough delay without the corresponding, decentralized circuit expense, enabling this merely with the assistance of a centralized fine delay device, advantageously realized with a variable delay line, whose delay time is respectively set in an equipment associated manner, i.e. set anew for each burst incoming from a decentralized equipment and being set based on the criterion of the reception phase relation resulting from the respective loop running time that is identified and stored in the switching center for each decentralized equipment.

In accordance with a further development and feature of the invention, employable both in a synchronous transfer mode (STM) telecommunication system as well as in an asynchronous transfer mode (ATM) telecommunication system, the light waveguide input side of the switching center can be provided with a delay device that is set by a delay time memory having respective memory locations assigned to the individual, decentralized equipment and being set in accordance with the criterion of a fine delay time just required for this particular decentralized equipment upon receipt of a burst transmitted from the decentralized equipment.

In a signal transmission proceeding in a continuous TDM burst stream from the switching center to the decentralized equipment and in a signal transmission proceeding in TDMA time channels reserved for the individual decentralized equipment from the decentralized equipment to the switching center, the memory locations of the delay time memory assigned to the individual decentralized equipment can be cyclically read with a chronological offset compared to the TDM burst stream that corresponds to the loop running time respectively achieved with the rough delay time and the delay device is set based on the criterion of the respective, stored fine delay time information. Given a signal transmission proceeding from the switching center to the decentralized equipment in an ATM cell stream from which each decentralized equipment takes only the ATM cells intended therefor and given a signal transmission proceeding from the decentralized equipment to the switching center in a TDMA method in accordance wherewith a decentralized equipment is respectively capable of transmitting an ATM cell after the equipment-associated dimensioned rough delay time only following the prior acceptance of an ATM cell on its part, the transmission of an ATM cell addressed to a defined, decentralized equipment after the loop running time achieved with the respective rough delay time advantageously causes the reading of the memory location of the delay time memory assigned to this decentralized equipment and effects the setting of the delay device based on the criterion of the stored fine delay time information.

BRIEF DESCRIPTION OF THE DRAWINGS

Other objects, features and advantages of the invention, its organization, construction and operation will be best understood from the following detailed description, taken in conjunction with the accompanying drawing, on which there is a single figure which is a block circuit diagram of a bidirectional light waveguide telecommunication system constructed and operated in accordance with the present invention.

DESCRIPTION OF THE PREFERRED EMBODIMENT

In a scope required for an understanding of the invention, the drawing schematically illustrates a bidirectional waveguide telecommunication system having a passive (preferably monomode) light waveguide bus network BPON that extends between a central telecommunication location, that is represented here by a switching center VSt, and a plurality of decentralized telecommunication equipment, here represented by what are referred to as distant units DU2, DU3.

As also indicated on the drawing, for example, such distant units can be interface equipment provided with an electro-optical/opto-electrical transducer o|e and provided with a multiplexer/demultiplexer Muldex at the electrical side thereof with whose assistance the remote unit may be assumed to potentially combine or, respectively, split up to 32 integrated services digital network B channels.

In this waveguide telecommunication system, the remote units DU2, DU3 are connected via a single-fiber light waveguide bus OB to a common light waveguide multiplex terminal of the switching center VSt. It is assumed that the equipment-associated light waveguide central office lines OAL1-OALn are thereby connected to the appertaining light waveguide bus OB via passive, i.e. non wavelength-selective, optical branchers V1-Vn, accommodated, for example, in cable brancher housings and being connected either directly thereto, as explicitly illustrated on the drawing, or via further such branchers. For example, tandem mixers or optical directional couplers can thereby be employed as optical branchers. It is also possible to provide a common optical brancher for a plurality of equipment-associated light waveguide central office lines, as is inherently known in the art (for example from EP-A2-0171080), this therefore not having to be set forth in greater detail herein.

In the telecommunication system illustrated on the drawing, a wavelength divinen mode (bidirectional wavelength multiplex) is provided for directional separation, whereby light having a first wavelength $\lambda 1$ lying, for example, in the 1300 nm band is employed for signal transmission in the downstream direction from the central telecommunication center VSt to the decentralized telecommunication locations DU2, DU3 and light having a somewhat longer, second wavelength $\lambda 2$ lying, for example, in the 1500 nm band is employed for the signal transmission in the upstream direction from the decentralized telecommunication locations DU2, DU3 to the central communication location VSt. To this end, an appropriate electro-optical transducer e/o advantageously formed by a laser diode and an appropriate opto-electrical transducer e\o advantageously formed by an avalanche diode are provided in the switching center VSt that forms the central telecommunication location, these transducers being connected to the appertaining light waveguide bus OB via a wavelength-selective, optical filter F, for example via a known optical separating module provided with an interference beam splitter, as disclosed, for example, in U.S. Pat. No. 4,790,616, fully incorporated herein by reference.

As likewise indicated on the drawing, the decentralized telecommunication locations, namely the distant units DU3, DU3 are correspondingly provided with electro-optical/opto-electrical transducers o|e.

As likewise indicated on the drawing, the signal transmission in the outlined telecommunication system proceeds downstream from the switching center VSt to the decentralized equipment DU2, DU3 in a burst stream $Z_{down}$, for example an ATM cell stream. Such ATM cells (each respectively comprising 53-bit-octets) each respectively comprising a (5 bit-octet) control information field (header) and a useful information field (covering 48 bit-octets). Part of the header (covering 16 bits) is what is referred to as the virtual path identifier; another part of the header is what is referred to as the access control field. When no useful information is to be transmitted, synchronization cells having pre-established bit patterns for synchronization of the decentralized equipment to the respective cell start can be mixed into the ATM cell stream $Z_{down}$ (what is referred to as pure ATM); however, it is also possible that the ATM cell stream $Z_{down}$ is, in turn, embedded into a time frame structure (for example, a SONET time frame structure) having synchronization signals (overhead) that occur at defined, fixed intervals (what is referred to as a frame-structured ATM). Each decentralized equipment DU takes only the bursts intended for it from the burst stream (ATM cell stream) $Z_{down}$, i.e. those ATM cells in the example that have their header, preferably the virtual path identifier therein addressed with an identifier assigned to precisely this decentralized equipment DU. The subdivision into header and useful information field is illustrated on the drawing for four ATM cells of an ATM cell stream $Z_{down}$, whereby the identifiers (3, 3, 2, n) marked in the headers of these four ATM cells indicate that the first two cells, carrying the useful information A and B, are intended for the decentralized equipment DU3, that the third cell, carrying the useful information C, is intended for the decentralized equipment DU2, and that the fourth cell carrying the useful information D, is intended for a decentralized equipment that is not illustrated on the drawing because of the lack of space and is reached via a light waveguide subscriber line OALn.

In the opposite transmission direction, the signal transmission from the decentralized equipment (distant units) DU upstream to the switching center VSt proceeds in a TDMA method with bursts (potentially, ATM cells) $Z_{up}$, in accordance wherewith a decentralized equipment DU transmits each burst in synchronized fashion with the assistance of a delay device that is set associated with a particular decentralized equipment DU from the switching center VSt, so that each burst is transmitted in the upstream direction in a time slot reserved for the appertaining decentralized equipment DU. What is thereby of essence for a reliable burst acceptance by the central telecommunication equipment VSt is that the bursts forming the upstream burst stream $Z_{up}$ are not merely simply transmitted in the respective reserved time slot, but that the centralized equipment VSt can also accept the same within this time slot with a desired, optimum reception phase relation.

This can be achieved with an appropriately finely-tuned delay time interval between the acceptance of a burst from the downstream burst stream $Z_{down}$ intended for a decentralized equipment DU by this same decentralized equipment DU and the subsequent transmission of an upstream burst $Z_{up}$, by this same decentralized equipment DU or, on the other hand, as likewise indicated on the drawing, can be achieved in that the decentralized equipment DU already transmits the bursts before the transmission time required for a desired reception phase relation of the burst in the switching center VSt, only after a rough delay time of one or more entire system clock periods and that it is the switching center VSt that centrally undertakes a respective, DU-associated dimensioned fine delay of the bursts incoming thereat into the desired reception phase relation. To that end, it is indicated on the drawing that the decentralized equipment DU2, DU3 are each respectively provided with a rough delay circuit GV leading to the electro-optical transducer o|e which may be assumed to enable a burst delay by whole multiples of the system clock periods, and that the central equipment (switching center) VSt has its input side provided with a variable fine delay device FV following its opto-electrical transducer e\o, this fine delay device FV being adjustable based on the criterion of the fine delay time of fractions of a system clock period that is required for this particular decentralized equipment DU via a central control device CC upon the respective receipt of a burst transmitted from a decentralized equipment DU. The adjustment is fashioned proceeding from a delay time memory FZ having memory locations assigned to the individual, decentralized equipment DU2, DU3. At the start up, either an initial start up or a re-start up as well of the decentralized equipment DU or, repeatedly from time-to-time as well, the fine delay time required for a specific decentralized equipment DU can thereby be identified by a central evaluation device (TDMA LOGIC) CL in a manner corresponding to the initially-mentioned, known identification of the loop running time or, respectively, of the delay time required based on the criterion of the loop running time and can have been written into the delay time memory FZ. For example, a delay line provided with appropriate, controllable taps can be provided as the fine delay device FV, the tap thereat that respectively corresponds to the respective required fine delay time being unlocked or unblocked thereat controlled proceeding from the delay time memory FZ.

Given a downstream signal transmission proceeding from the switching center VSt to the decentralized equipment DU and proceeding in an ATM cell stream from which each decentralized equipment DU accepts only the ATM cells intended therefor, and an upstream signal transmission proceeding from the decentralized equipment DU to the switching center VSt in a TDMA method in accordance wherewith a decentralized equipment DU is respectively capable of transmitting an ATM cell after the equipment-associated, dimensioned rough delay time only following the prior acceptance of an ATM cell on its part, this can occur in such a fashion that the transmission of an ATM cell addressed to a specific, decentralized equipment DU causes the reading of the memory location of the delay time memory FZ assigned to this decentralized equipment DU after the loop running time achieved with the respective rough delay time and effects the setting of the delay device FV based on the criterion of the stored fine delay time information. In a downstream signal transmission from the switching center VSt to the decentralized equipment DU proceeding in a continuous TDM burst stream and in an upstream signal transmission from the decentralized equipment DU to the switching center VSt proceeding in TDMA time channels reserved for the individual centralized equipment DU, the memory locations of the delay time memory FZ assigned to the individual decentralized equipment DU can be cyclically read with a chronological offset compared to the TDM burst stream that corresponds to the loop running time achieved with the respective rough delay time, whereby the delay device FV is set based on the criterion of the respectively-stored fine delay time information.

The rough delay circuit GV that is respectively provided in the individual switching equipment DU, can be realized, for example, with a digital delay element in the form of a system (bit) clock-controlled shift register and is set based on the criterion of the rough delay time required at the appertaining decentralized equipment DU, the setting being accomplished proceeding from a decentralized evaluation device DL following the opto-electrical transducer o|e via a decentralized drive device DC, so that the decentralized equipment DU transmits in the time slot reserved therefor. This setting can proceed in a manner corresponding to the initially-mentioned, known setting of a programmable digital delay device and therefore need not be set forth in greater detail here. However, it should also be pointed out that the rough delay time and the fine delay time for each decentralized equipment DU can be individually dimensioned at the start up thereof, the initial start up or a re-start up as well. To this end, the switching center VSt can potentially output a plurality of immediately-successive ATM cells addressed in the header to the appertaining decentralized equipment DU, the plurality thereof being prescribed based on the criterion of the maximum running time and their useful information type being identified in the header as maintenance information. After receipt of these (maintenance) ATM cells, the decentralized equipment DU to be initialized answers without delay, likewise answering with (maintenance) ATM cells whose useful information type is identified in the header as maintenance information. Based on the time interval between transmission and reception of (maintenance) ATM cells, the switching center VSt then calculates the rough delay time of the appertaining decentralized equipment DU required for achieving the prescribed loop running time and, subsequently, calculates the required fine delay time. Since, upon initialization of a decentralized equipment DU, the ATM cell stream carrying the useful information is interrupted for a certain time, for example, for approximately 40 ATM cells given a maximum loop running time of, for example, 100 μs and given an aggregate bit rate of 150 Mbit/s on the light waveguide bus OB, the useful information arising during this time for transmission is to be intermediately stored in corresponding cell buffers that can then be emptied in turn after the conclusion of the phasing event.

During operation, the switching center VSt can monitor the time gaps occurring between the received ATM cells $Z_{up}$ for observation of the prescribed limits and, when these are upwardly or, respectively, downwardly exceeded, can correspondingly modify the appertaining, DU-associated delay time, so that the time gaps can be brought back to the reference value on the basis of DU-associated readjustment of the delay time. To this end, the switching center VSt can communicate, an appropriate readjustment information to the appertaining decentralized equipment DU in the access control field of the ATM cells $Z_{down}$, that are addressed to this decentralized equipment DU and carry the useful information or, respectively, can correspondingly correct the fine delay time stored in its own delay time memory FZ for the appertaining decentralized equipment DU.

In conclusion, the present invention may be summarized once again as follows.

In the TDM/TDMA transmission, the central equipment (switching center) VSt continuously transmits data bursts for all connected decentralized equipment (distant units) DU. Each decentralized equipment DU extracts the data bursts intended therefor and transmits a data burst back to the switching center. This latter data burst is transmitted in a time slot reserved for the respective decentralized equipment DU. The incoming data bursts are accepted and processed further in the central switching equipment VSt. Although the incoming data thereby, in fact, initially have the same frequency corresponding to the system clock frequency of the central switching equipment VSt, the individual data packets nonetheless have different phase relationships when they arrive at the switching center VSt because of the different running times on the transmission link to or, respectively, from the individual distant units (due to the different lengths of the respective optical fiber paths). Both the different running times are to be compensated so that the data fall into the time slot assigned thereto, and the respective phase. In order for the incoming data to be sampled without acceptable errors, it is necessary to accept these data in the middle of the data.

In order to overcome this problem, it is known that both a rough shift and a fine shift are implemented at the distant unit (Br. Telecom Technolog. J. op. cit, pp. 100 and 108). Rough shift denotes that the transmission data are delayed into the proximity of a reference transmission position with the system clock internal to the distant unit DU. The transmission data are delayed by n-fractional clock steps with the fine shift (for example, with analog delay lines), so that the phase relation of the remote unit DU transmission data is in phase in the central equipment VSt with the central switching equipment VSt system clock and can be accepted.

The rough shift in accordance with which the data burst is delayed by whole multiples of the clock (realized, for example, with a digital delay element) is set such via a control logic that the remote unit transmits in the time slot reserved therefore. For example, an adjustable analog delay line that is present in each remote unit effects the following fine shift.

The present invention produces a solution that is more technologically beneficial in comparison thereto with the elimination of a fine delay at each remote unit DU and by undertaking a respective fine delay that is dimensioned associated to the remote or distant unit DU of the data bursts incoming into the central switching equipment VSt with a central fine delay device provided thereat. For each remote or distant unit DU, the appertaining phase relation of the bursts incoming thereat is first defined and is stored in a memory and, thereupon, the corresponding fine delay is set with the control logic based on the criterion of this phase relation at the respective arrival of a data burst. The incoming data are therefore delayed by n-fractional system clocks and are then in an optimum phase relation for acceptance. Only a single, variable fine delay line for all connected remote units is required with this central fine setting of the phase.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a passive optical communications system of the type in which each of a plurality of decentralized equipment is connected via a respective light waveguide line, a respective optical brancher and an optical waveguide bus to a common light waveguide terminal of a central switching center, in which the signal transmission from the central switching center to the plurality of decentralized equipment proceeds on a time-division multiplex basis, clocked by a system clock, in a burst stream from which each of the decentralized equipment accepts only a respective burst intended therefor, and in which the signal transmission proceeding from each of the decentralized equipment to the central switching center proceeds according to a time-division multiple access method in which each burst is transmitted in a synchronized fashion with the assistance of a respective delay in each of the decentralized equipment which is set for that particular decentralized equipment proceeding from the central switching center to obtain a desired reception phase relation, the improvement wherein:

each of said decentralized equipment consisting means for transmitting a respective burst before a transmission time required for the desired reception phase relation of the burst in the central switching center only after a rough-first predetermined delay time of at least one multiple of the system clock period; and means in said central switching center for providing a fine, second predetermined delay time for the respective burst incoming from a respective decentralized switching center to produce the desired reception phase relation.

2. The improved passive optical communication system of claim 1, wherein:

a delay device is provided in the central switching center and is coupled to the common light waveguide terminal thereof, said delay device being set to the time delay of a respective decentralized equipment in response to receipt of a signal burst transmitted by that decentralized equipment;

a delay time memory is provided in the central switching equipment and includes a plurality of memory locations each assigned to and storing data representing the fine, second predetermined delay for the respective decentralized equipment; and control means connected between said delay means and said delay time memory for reading the respective information from said memory locations and setting said delay means to the respective delay.

3. The improved passive optical communication system of claim 2, wherein:

given a signal transmission from the central switching center to the decentralized equipment proceeding in a continuous time-division multiplex burst stream and a signal transmission from the decentralized equipment to the central switching center proceeding in accordance with time-division multiple access time channels reserved for the individual decentralized equipment;

said central switching center comprises a memory including a plurality of memory locations for respectively storing the delay time assigned to the individual decentralized equipment, delay means for delaying the burst received in the time-division multiple access time channels; and means connected between said delay means and said memory for cyclically reading said memory locations with a chronological offset in comparison to the time-division multiplex burst stream that corresponds to the loop running time achieved with the respective rough, predetermined delay time to set said delay means based on the criterion of the respective stored fine delay time information.

4. The improved passive optical communication system of claim 2, wherein:

given a signal transmission from the central switching center to the decentralized equipment proceeding in an asynchronous transfer mode cell stream from which each decentralized equipment accepts only the asynchronous transfer mode cells intended therefor and given a signal transmission from the decentralized equipment to the central switching center proceeding in a time-division multiple access method in accordance wherewith a decentralized equipment is capable of transmitting an asynchronous transfer mode cell after the rough, first predetermined time delay only after the respective prior acceptance of an asynchronous transfer mode cell by that decentralized equipment, said central switching center comprises a delay time memory including a plurality of memory locations each storing the fine, second predetermined delay time of a respective decentralized equipment; and said central switching center comprises means operable to read the respective time delays from said memory locations after the loop running time achieved with the respective delay time and to set said delay device to the respective fine, second predetermined delay time.

5. The improved passive optical communications system of claim 4, wherein:

said delay device comprises a plurality of taps for providing the individual fine, second predetermined delay times.

6. The improved passive optical communication system of claim 5, wherein:

each of said plurality of decentralized equipment includes a delay circuit coupled to its respective light waveguide line and controlled by the system clock based on the criterion of the rough, first predetermined delay time.

* * * * *